Feb. 18, 1941.         I. GURWICK         2,232,062
FABRICATION OF SHEET MATERIAL
Filed Jan. 23, 1939
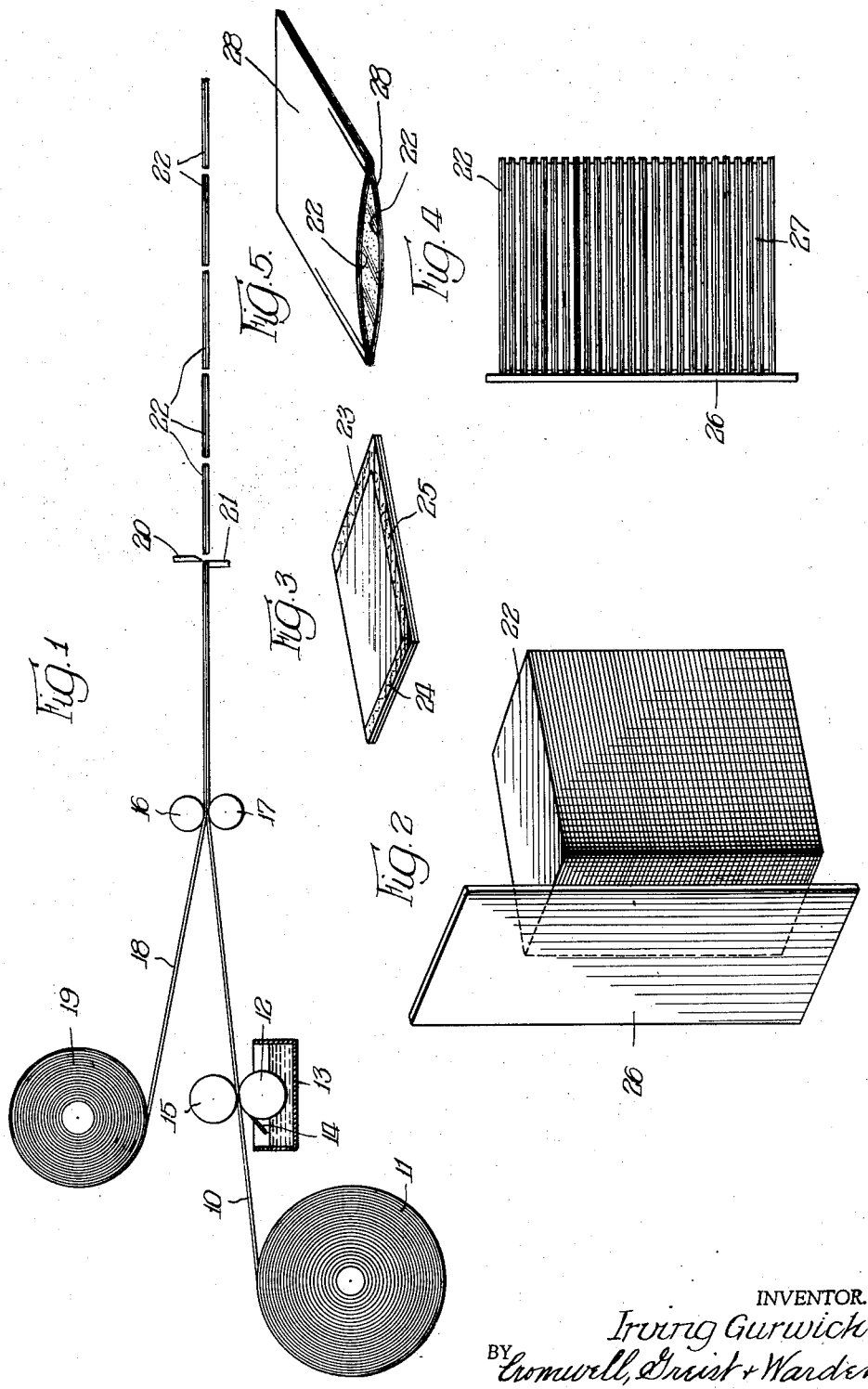
INVENTOR.
Irving Gurwick,
BY Cromwell, Greist + Warden
ATTORNEYS.

Patented Feb. 18, 1941

2,232,062

UNITED STATES PATENT OFFICE 2,232,062

FABRICATION OF SHEET MATERIAL

Irving Gurwick, Mount Vernon, Ohio, assignor to Shellmar Products Company, Mount Vernon, Ohio, a corporation of Delaware Application January 23, 1939, Serial No. 252,259

10 Claims. (Cl. 93—35)

The present invention relates to the fabrication of articles or containers from sheets of halogenated rubber compounds such as the product known as "Pliofilm," and refers in particular to an improved method of joining edge portions of two sheets of transparent rubber hydrochloride.

A principal object of the invention is the provision of an improved process for joining together the edge portions of sheets of halogenated rubber compounds in which preferably a large number of sheet units are stacked with the edges of each unit in predetermined relation with respect to the next adjacent unit, and the adjacent edges of the sheets in each unit being sealed together by the application of heat as by a hot plate or open flame, the sheet units being firmly separated from each other to prevent the sheets of one unit from being firmly bonded to the sheets of an adjacent unit.

A further object of the invention is the bulk sealing of the edge portions of units of rubber hydrochloride stacked together in heat-insulated relation with their edges in alignment by the progressive or simultaneous application of heat.

Still another object of the invention is the production of containers from sheets of rubber hydrochloride by combining two or more sheets together in unsealed relation with the borders of at least one of the sheets having an exterior printed line adjacent the portions to be sealed, combining a plurality of such units in edge alignment, and simultaneously sealing the edges of the sheets and the several units.

A still further object of the invention is to produce containers from rubber hydrochloride by combining two or more sheets together as a unit and stacking a plurality of such units together with interposed firmly heat-insulating sheets preferably spaced from the edges to be sealed, and simultaneously heat-sealing the edges of the sheets in the several units.

These and other objects will be evident upon a consideration of the following description of a preferred embodiment of the invention, and by reference to the accompanying drawing, in which Fig. 1 is a diagrammatic view of a method of producing container units with printed edges;

Fig. 2 is a perspective view of a stack of the units produced as shown in Fig. 1 positioned for heat-sealing;

Fig. 3 is a view of a container formed by heat-sealing the edges of the units as shown in Fig. 2;

Fig. 4 is a plan view of a modified form of the bulk sealing method in which insulating sheets are interposed between the units; and Fig. 5 shows a laminated container formed by the improved process from paper and rubber hydrochloride sheets.

Within recent years a material which has become of some importance in the production of containers for food products and the like consists of rubber hydrochloride produced in the form of transparent pellicles. This type of material has the advantage of being highly moisture-resistant and is well adapted for the production of containers for products in which retention of freshness is a factor. Some difficulty is encountered in sealing sheets of this material together due to its non-fibrous nature and to the fact that adhesives are not too successful in securing sheets of the rubber hydrochloride together.

A good method of producing a union between adjacent sheets of rubber hydrochloride material includes the application of heat along the edge, preferably with little or no pressure. The rubber hydrochloride is sufficiently thermoplastic to produce a composite edge union when brought in contact with heat, the bond being substantially as strong as the material of the pellicle from which it is produced and having the advantages of being quite narrow and inconspicuous. One method of applying the heat consists in passing a flame momentarily in contact with or close to adjacent edges of sheets of the rubber hydrochloride.

In preparation of the material for the bulk sealing method indicated in Fig. 1, a web 10 of transparent rubber hydrochloride is passed from the roll 11 through an intaglio printing unit having an etched printing cylinder 12 which revolves in a color bath 13. A conventional doctor blade 14 removes excess material from the etched cylinder so that there is deposited on the web a printed line of any desired width, preferably of the order of a quarter of an inch, along the portions of the web which are to form edges to be sealed. An impression roll 15 maintains the web 10 in contact with the printing cylinder 12. The material deposited upon the web may be a pigmented lacquer ink of the type customarily employed in printing various transparent sheets. Such lacquers contain non-thermoplastic ingredients which act as an insulating agent to prevent sticking together of adjacent sheets during the sealing operation. Unpigmented material also may be used instead of the pigmented ink. That is, a line of a clear lacquer or coating may be deposited along the portions of the web which are to form edges to be heat-sealed. These unpigmented lines may be invisible or only slightly visible in the finished product.

After deposition of the lines of ink on the web the web is brought together between the rolls 16 and 17 with a second web 18 taken from the roll 19, this second web also being composed of transparent rubber hydrochloride. It will be noted that the ink is deposited on the outside of the web. The ink is a quick-drying intaglio ink which is dry by the time the printed section of the web reaches the rolls 16 and 17.

The composite web is passed from the rolls 16 and 17 through a cutting unit of conventional construction indicated by the upper knife 20 and the lower cutting edge 21. The cutting unit operates in register with the printed portion of the web to cut the web along a printed edge if there is to be a transverse seal between the two sheets.

After the composite web is cut into the units indicated at 22 the units are stacked together in the manner shown in Fig. 2 with the edge portions thereof in alignment. The container shown in Fig. 3 is sealed along three edges. The outer edge portions are provided with the printed lines 23 and 24 while the transverse edge to be sealed is provided with the line 25 of printed ink. The edge of the unit adjacent line 25 is formed by the cutting knife 20 and when sealed constitutes the bottom of the resulting envelope.

The sealing operation is shown as being effected by a hot plate 26 which is pressed up against the exposed edges of the superimposed container units, preferably so that all or a plurality of the units are sealed at the same time. When this is done it will be seen that the hot plate uniformly is contacted by the entire group of container units. The stack of container units offers a considerable body which prevents buckling of the units upon contact with the hot plate. At the same time the printed lines along the edges to be sealed prevent adjacent container units from being sealed together.

The hot plate 26 may be heated in any conventional manner such as by electric coils or direct fire. An advantage of the present invention is that by contacting a large number of units with the hot plate at one time there is little chance for damage due to local overheating of the containers. The method is quite simple in operation, since all that is necessary to effect the seal is to press the hot plate 26 against the stack of container units for the necessary time. The particular time will depend upon the temperature of the plate and the extent to which the layers of rubber hydrochloride are to be sealed together. That is, it will be understood that in the case of a very hot plate less time is required than in the case of a plate which is less hot.

After the seal is completed the container units are ready for shipment or use and it will be found that the edge seal is as strong or stronger than the sheet itself.

In the embodiment of the invention illustrated in Fig. 4 a plurality of container units are produced in the manner described except that the printed margin may be omitted. To effect the bulk sealing of containers of this type there is interposed between each of the adjacent container blanks a spacing sheet such as indicated at 27. It will be seen from the drawing that the spacing sheets 27 do not extend quite to the edge of the containers. The slight amount of rubber hydrochloride extending beyond the spacing sheets is subjected to the action of the hot plate 26 when the latter is brought into the position shown in Fig. 4 and there is effected a seal of the sheets of the individual container units. In this modification of the process the container units 22 as produced may be interleaved with sheets of paper which will act as the spacing sheets 27 and the resulting stack then is brought into contact with the hot plate.

The bulk sealing method described herein is so effective that it is possible to employ an open flame to produce the thermoplastic union of the sheets in the individual container units.

In one important application of the bulk sealing method the container units are formed by folding a sheet upon itself in overlapped relation to form a continuous bottom, the unjoined and aligned sides being sealed to complete the container by stacking a number of the container units together in insulated relation and contacting the stack of container blanks with a hot plate. The fold may be made between oppositely printed designs or otherwise as desired. The hot plate may be in the form shown in the drawing or it may be a roll which is passed along the exposed edges of the stacked container blanks.

The method is of particular utility in producing containers from rubber hydrochloride sheets which are laminated to paper or other insulating materials. As shown in Fig. 5, such containers may be produced by laminating interior sheets 22 of rubber hydrochloride to exterior sheets 28 of paper. This lamination may be effected by any suitable adhesive such as a rubber adhesive. The containers are formed by assembling the sheets of paper and rubber hydrochloride together in such a manner that the rubber hydrochloride sheets constitute the interior of the blank. A number of such units are stuck together and heat is applied to the edges thereof in the manner described hereinbefore to effect union between the adjacent sheets of rubber hydrochloride. Ordinarily, in the production of containers of this type it will be desirable to laminate webs of the rubber hydrochloride material to webs of paper and subsequently to cut blanks of the material from such webs as desired. The laminated blanks may be in one piece, if desired, and can be folded in such a manner as to form a continuous bottom, thereby rendering it unnecessary to seal the bottom and providing the additional strength of a continuous paper layer about the container. In either case, the formation of the containers is effected by stacking a plurality of the units together with their edges in register and then bulk sealing the exposed edges. Other materials than paper may be used in this connection as the exterior layer for the containers. Regenerated cellulose is an example of another suitable material. The regenerated cellulose is not affected by the heat sufficiently to prevent the formation of a successful package.

It will be evident that many changes may be made in the method described without departing from the scope of the invention. For instance, both of the adjacent layers of rubber hydrochloride in the container units may be printed. A rectangular container unit has been shown, but the method is quite well adapted to the production of containers of odd shapes. That is, the bulk sealing method is particularly well adapted to produce containers of triangular or circular or other shapes without the necessity of arranging for a special apparatus to effect the sealing. All such embodiments are intended to be included in the appended claims.

I claim:

1. The method which comprises printing a web of rubber hydrochloride, cutting said web into container units with the printed matter adjacent the edges of the units, assembling a second sheet of said material with said units in edge alignment, stacking a plurality of said units together, and heat sealing the edges thereof.

2. The method which comprises producing a plurality of container units each including two sheets of rubber hydrochloride having edges in alignment, stacking a plurality of such units together, interposing a spacing and insulating member between adjacent units, and heat-sealing the edges of the stacked units.

3. The method of forming containers, which comprises producing a plurality of container blanks by folding sheets or rubber halide upon themselves to form continuous bottom sections and aligned unattached edges, stacking said blanks together in insulated relation with said unattached edges adjacent each other, and heat-sealing the unattached edges of said blanks while in stacked relation.

4. The method of forming containers, which comprises producing a plurality of container blanks composed of laminated sheets of paper and rubber halide, the sheets of rubber halide in adjacent blanks being in face-to-face relation, stacking the blanks together with the unattached edges thereof adjacent each other, and heat-sealing the unattached edges of the blank while in stacked relation.

5. The method of sealing together sheets of thermoplastic rubber hydrochloride material, which comprises stacking together a plurality of units each of which includes two sheets of said material with edges in adjacent relation, the adjacent edges of said units being on the same side of said stack, and heat-sealing the adjacent edges of said units while in stacked relation.

6. The method which comprises laminating sheets of a thermoplastic material to backing sheets of non-thermoplastic material, stacking together a plurality of units composed of at least one of said laminated sheets having its thermoplastic sheet in face-to-face relation with a second thermoplastic sheet, said thermoplastic sheets in face-to-face relation having edges in adjacent relation spaced from the corresponding edges of the next units by said backing sheets, and the adjacent edges of said units being on the same side of said stack and heat-sealing the adjacent edges of said units while in stacked relation.

7. The method which comprises stacking together a plurality of units composed of sheets of thermoplastic material having edges in adjacent relation, the adjacent edges of said units being on the same side of the stack, interposing a sheet of paper between adjacent units, and simultaneously heat-sealing the adjacent edges of said units while in stacked relation.

8. A process of the character described, consisting in stacking superimposed sheets of hydrochlorinated rubber and sheets of paper, with a plurality of contacting sheets of hydrochlorinated rubber between spaced sheets of paper, and applying heat to an edge of the stack so that the outer edges of the contacting sheets of hydrochlorinated rubber may become fused and attached together.

9. A process of the character described consisting in stacking a plurality of pairs of contacting sheets of thermoplastic material with edges in adjacent relation, and with non-thermoplastic material between adjacent pairs of contacting sheets, and applying heat to an edge of the stack so that the outer edges of the contacting sheets of thermoplastic material become fused and attached together.

10. A method of the character described consisting in stacking a plurality of units together, each including two sheets of thermoplastic material having edges in alignment on the same side of the stack, interposing non-thermoplastic insulating material between adjacent units, and heat sealing said edges of the stacked units by applying heat to said side of said stack.

IRVING GURWICK.